Nov. 12, 1940.          W. B. SCHMIDT          2,221,414
AMUSEMENT PARK SAFETY DEVICE
Filed Feb. 10, 1938          9 Sheets-Sheet 1

Inventor
William B. Schmidt
By George H. Simmons
Atty.

Nov. 12, 1940.　　　W. B. SCHMIDT　　　2,221,414
AMUSEMENT PARK SAFETY DEVICE
Filed Feb. 10, 1938　　　9 Sheets-Sheet 6

Inventor
William B. Schmidt
By George H. Simmons
Atty.

Nov. 12, 1940.   W. B. SCHMIDT   2,221,414
AMUSEMENT PARK SAFETY DEVICE
Filed Feb. 10, 1938   9 Sheets-Sheet 8

Inventor
William B. Schmidt
By George W. Simmons
Atty.

Patented Nov. 12, 1940

2,221,414

UNITED STATES PATENT OFFICE 2,221,414

AMUSEMENT PARK SAFETY DEVICE

William B. Schmidt, Chicago, Ill.

Application February 10, 1938, Serial No. 189,807

13 Claims. (Cl. 104—53)

This invention relates to devices for safeguarding passengers on cars and trains such as are found in an amusement park, and has for its principal object the provision of safety devices upon cars and trains of this class.

It is a main object of the invention to provide safety devices of this class which serve also to improve the appearance of the cars and trains so as to attract passengers thereto.

Another object of the invention is to provide a safety top for a car such as is used in a roller coaster, which top is designed to prevent a passenger from standing up in the car.

A further object of the invention lies in the provision of a safety top for the cars of an amusement park train designed to add the effect of streamlining to the train.

Still another object of the invention is to provide a safety top which is self-contained and self-braced and is capable of being mounted upon an existing car by resilient means.

A further object of the invention lies in the provision of a door mounted in the safety top and adapted to be closed across the doorway opening therein to prevent passengers from leaving the car while the train is in motion.

Another object of the invention lies in the provision of a safety handle bar for each seat of an amusement park car adapted to be locked in position over the laps of passengers to aid in holding them in the seats and to discourage standing up in the car.

Still another object of the invention is to provide a guard on the back of the seats of a car to prevent a passenger from being injured should his face or head come in contact with the seat.

It is a further object of the invention to provide an improved method and means for supporting the seats in an amusement car.

A still further object of the invention is to provide an improved and resilient mounting for the weight-supporting wheels of an amusement car to cushion the impact of the car upon the rails and to decrease the distortion of the frame of the car.

Further objects of the invention not specifically mentioned here will be apparent from the detailed description and claims which follow, reference being had to the accompanying drawings in which a preferred embodiment of the invention is shown by way of example, and in which:

In amusement parks, trains of two or more cars coupled together are used upon roller coasters, scenic railways and other similar rides. Usually, the cars of a train of this type consist of a heavy frame or chassis which is generally rectangular in shape and composed of wood or metal, or of a combination of wood and metal. The chassis is supported upon individually-hung wheels which rest upon a track to support the chassis thereon. Other wheels are provided to engage a vertical surface on the track to take up side thrusts developed as the car moves thereover and, in the case of roller coaster cars, an additional set of safety wheels are provided to guard against the possibility of the car jumping the track.

One or more seats are fitted in each car inside the chassis and at a short distance thereabove, the seats being low so as to keep the center of gravity of the car as low as possible. Seats are upholstered either with a padding material and springs or with a more resilient material, such as sponge rubber, without springs.

Hand rails or handle bars are disposed in front of each seat, these bars usually being fixed to the back of the seat ahead, except in case of the front seat where the handle bar is a part of the forward end structure of the car.

The tracks over which trains of this type are moved contain sudden and rather abrupt changes in grade and sharp curves which are usually steeply banked for safety. As a result of the roughness of the track and speed of the train moving thereover, the chassis is subjected to many stresses which cause it to give appreciably and furthermore the seats of the car have been found to move appreciably with respect to the chassis.

In the case of a roller coaster, the greatest danger of injury to a passenger rises from the tendency of fool-hardy passengers to stand up in the car while the train is in motion. Such passengers are sometimes thrown from the train and severely injured or even killed and the amusement park suffers a heavy loss thereby, arising both from the damages sustained by the injured party and from the loss of patronage on the ride resulting from the publicity attendant the accident.

In accordance with the objects of the present invention, this loss is minimized by making it more difficult—if not impossible—for a passenger to stand up in the car while the train is in motion. Since the passengers most likely to be attracted to a roller coaster are young people on pleasure bent and apt to be somewhat reckless, it is desirable to design the top by which they are prevented from standing up in the train so as to conceal its real purpose. This is done within the teachings of the present invention by designing the top so as to add the effect of streamlining to the train, the top being finished in such a manner as to further add to the attractiveness of the train, it having been found that if the top is of sufficiently pleasing appearance to persons in the amusement park it attracts passengers to the ride rather than detracts them therefrom. In other words, a pleasing appearance is good salesmanship.

In carrying out the teachings of this invention in its preferred form, the top structure is built as a self-contained, self-braced frame composed of a plurality of arches disposed in spaced-apart relation and connected by members running longitudinally of the car. The end ones of the arches are trussed to add strength to the structure. The arches are supported upon sills which are adapted to fit upon the chassis of the car and be supported thereon by resilient means so that the top may move with respect to the car as the train moves over the track. The framework of the top placed upon the forward car of the train is equipped with a nose structure and the framework of the top of the rear car of the train with a tail structure which combine to add to the effect of streamlining of the train. The frameworks overhanging the ends of the train serve also as safety devices since in a collision they must be crushed before the chassis of the end cars can be reached.

The frameworks thus provided are covered with a covering which may be sheet metal, a composition generally known as "presswood," or other similar sheet-like material. This sheet extends from the sills of the top up to a line just below the shoulders of a passenger seated in the seats of the car, the covering being broken away immediately in front of each seat to provide a doorway upon one side of the train. The remainder of the framework above the upper edge of this solid covering is covered with an openwork material, such as expanded metal, screen wire or perforated metal so that the passengers may see out of the car as the train moves over the trackway. The doorways on the one side of the car extend into this perforated top member and window openings are formed in it on the opposite side of the car.

The covering thus formed may be painted in attractive colors or left in the natural color of the material used, if desired. In one embodiment of the invention, the covering placed over the framework of the top structures is composed of a bright, shiny metal, such as stainless steel, for example, the solid sheet-like portion of the covering being corrugated. A train so constructed is bright and adapted to reflect lights which may be played upon it as the train moves over the trackway, thereby attracting attention to the ride.

The nose structure of the leading car on the train may be equipped with a headlight and the tail structure of the rear car with tail lights to add to the attractiveness of the train. The spaces in between the cars are preferably filled in with a flexible material which harmonizes with the covering on the car so as to give the train a definite appearance of streamlining from the front to the rear end.

Preferably, the doorways left in the tops to permit passengers to enter and leave the cars are blocked while the train is in motion by suitable doors. These doors may be, and preferably are, composed of the same kind of material as the covering on the top; i. e., if the covering is corrugated, the door will be composed of corrugated material so that when closed, the lines of the car are not broken. Doors obviously discourage passengers from attempting to enter or leave the car while the train is in motion.

Passengers seated in the seats of a car of this type are supposed to keep a firm handhold upon the rail or handle bar that is provided for the purpose, however, occasionally a passenger will not hold on and will be thrown from the seat as the car makes a sudden change in the direction of its movement. Ordinarily, the passenger is not seriously injured, but may sustain some slight injury. In carrying out the safety ideas of the present invention, the cars are preferably equipped with handle bars which are pivoted to the chassis of the car and adapted to be locked in position over the laps of the passengers therein, these bars aiding in holding the passenger on the seat even though he should not maintain a handhold on the hand rail.

Another source of minor injuries to passengers is the back of the seat ahead of the seat upon which they are riding, passengers sometimes being thrown into engagement with this back or with the handrail mounted thereon with sufficient force to injure them about the face and head. To guard against injuries of this kind within the teachings of the present invention, there is provided a roll of the resilient material which extends upwardly and rearwardly of the back of the seat and is positioned so as to prevent a passenger from coming into contact with the back of the seat or the handrail should he be thrown out of the seat.

As explained above, the seats of the cars of an amusement train have heretofore been mounted in the chassis so as to have limited movement with respect thereto. In one embodiment of the present invention, the seats are not mounted upon the chassis at all but rather are supported in the safety top structure which is itself mounted upon the chassis by resilient means. The supports by which the seats are carried in the top structure are arranged to have a certain amount of give so that a new and definitely different riding effect is accomplished by their use.

Heretofore, the independently-hung weight-supporting wheels by which the chassis is supported upon the rails have been fixed upon axles which are rigidly supported with respect to the chassis. As a result of this construction, there is a great amount of wear and tear upon both the car and trackway and frequent expensive repairs are necessary to keep the same in safe condition. In accordance with the teachings of the present invention, the axles upon which the weight-supporting wheels are journaled are supported upon the chassis by resilient means. The resilient means used for this purpose is arranged to permit considerable but limited movement of the axle vertically while at the same time preventing both lateral and forward-and-backward movement. This arrangement cushions the impact of the car upon the trackway and the trackway upon the car but does not permit side-sway of the car.

From the foregoing, it will be seen that within the teachings of the present invention, the cars and trains of a ride in an amusement park are made more attractive by safety devices whose real purposes are concealed by their very design. The passengers are protected from injury in every possible manner, even though they be careless and violate the common rules of personal safety.

Referring now to the drawings in more detail, particularly Figures 1, 4, 8 and 9, it will be seen that the car of an amusement park train shown by way of example consists of a generally rectangular frame having parallel side members 1 and 2 that are supported upon weight-supporting wheels 3 and 4 which rest upon a track 5. Wheels 3 and 4 and the corresponding wheels on the opposite side of the car are each independently hung. Suitable cross members, not shown, extend between the side rails 1 and 2 to form a fairly rigid rectangular frame for the car. The particular details of the construction of this frame are old and well understood by those skilled in the art and need not be referred to in any great detail herein. It is sufficient to say that the framework may be composed either of wood or metal or of a combination of wood and metal and is designed so as to be capable of having a certain amount of give to enable the car to negotiate the abrupt changes in grade and sharp curves in the track.

Figure 1:
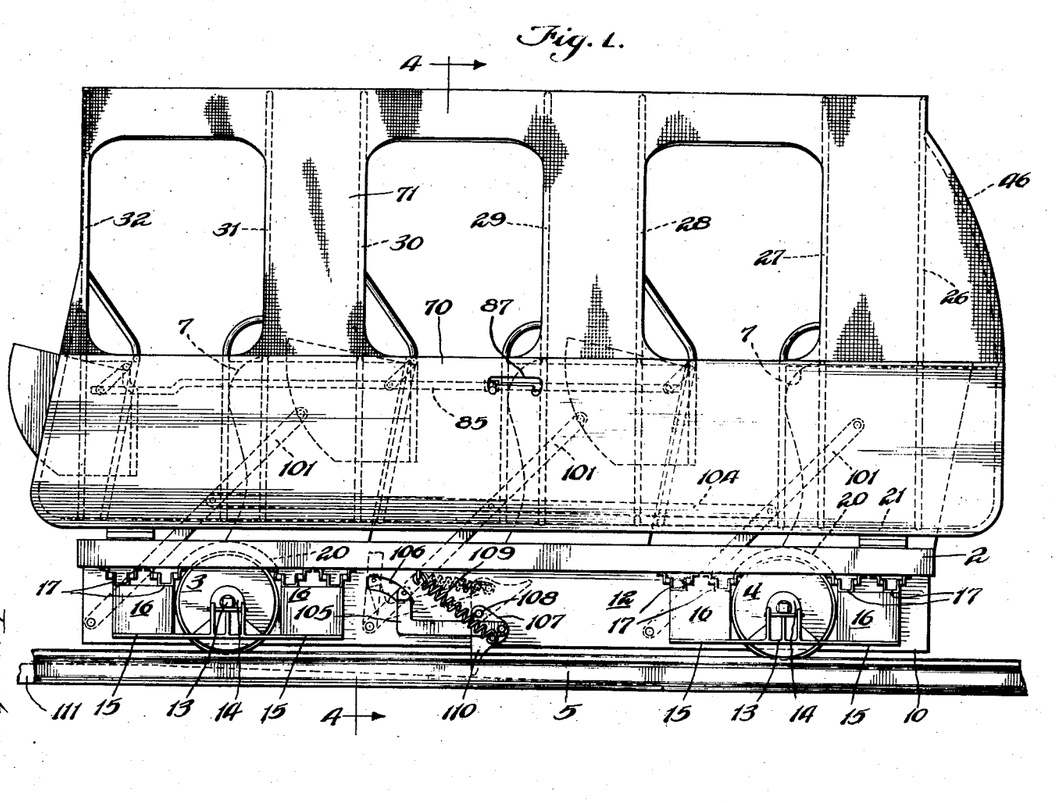
Fig. 1 is a side elevational view of an amusement park car with the devices of the present invention mounted thereon.

The framework thus provided may be equipped with from one to four seats, a 3-seat car being illustrated in Figure 1 by way of example.

Figure 4:
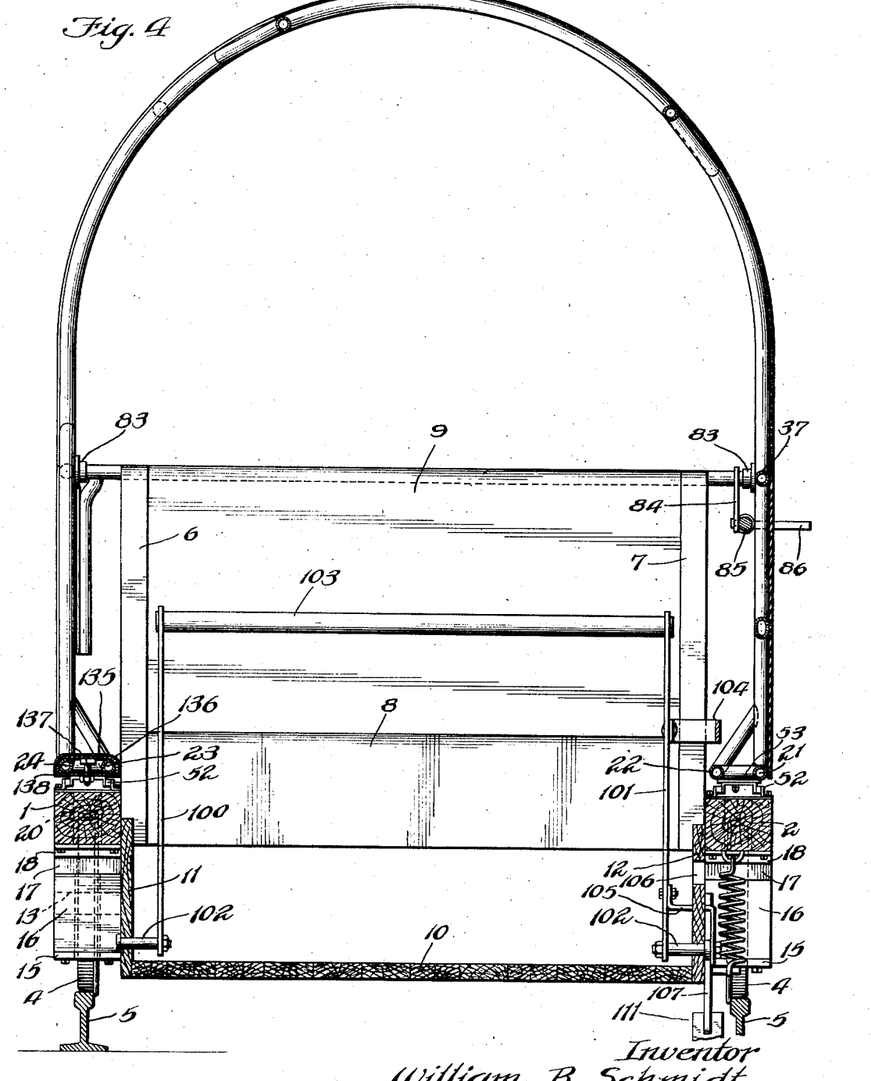
Fig. 4 is a cross-sectional view taken substantially along the line 4—4 of Figure 1, looking in the direction of the arrows.

Each of the seats consists of a pair of end plates 6 and 7, Figure 4, which are upholstered and are fitted down inside of the side rails 1 and 2. A seat 8 and back rest 9 are supported between the end plates 6 and 7 and are upholstered either with springs covered by a padding material or with a very resilient material without springs. The seats so constructed are mounted between the side walls of the frame of the car are capable of limited movement with respect to the frame.

The chassis of the car is completed by a floor 10 supported beneath the seats and side rail members 1 and 2 by suitable wall means 11 and 12, the floor 10 being disposed beneath the center line of the wheels and at a proper distance below the seat portions 8 of the seats of the car. By this arrangement, the passengers upon the seat ride low in the car and within the chassis thereof.

The foregoing details of the construction of the amusement car are given by way of example only to illustrate the type of car to which the devices of the present invention may be attached, it being understood that these devices may be placed upon cars which vary in construction considerably from the foregoing.

Figure 9:
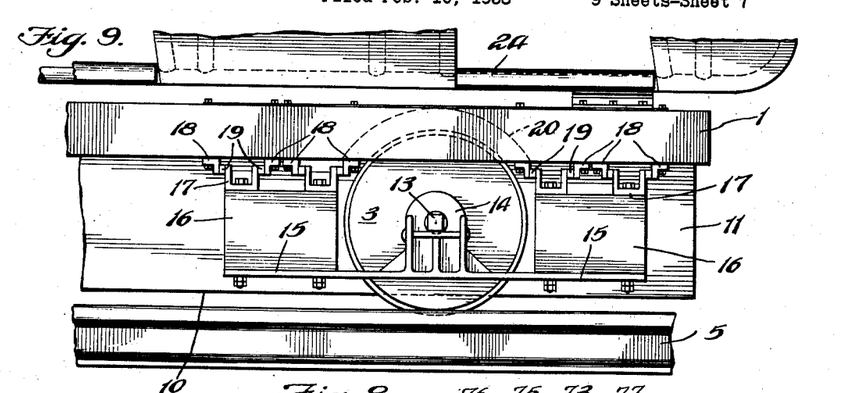
Fig. 9 is a fragmentary elevational view showing the mounting arrangement for one of the wheels of the car.

As will be seen in Figure 9, the wheels 3 and 4 of the car are adapted to rotate about a fixed axle 13 which projects through a mounting plate 14 that extends downwardly from the axle and is equipped with arms 15 extending fore and aft of the axle. Spacing blocks 16 are fixed upon the free ends of the arms 15 and extend upwardly on opposite sides of the wheel.

Resilient mounting means are secured to the spacing blocks 16 and to the side rails of the car. There are a number of different resilient mounting means available upon the open market which may be used within the teachings of the present invention. As shown in Figure 9, the mounting means consists of a channel 17 bolted to the spacing blocks 16 with its flanges extending upwardly therefrom. Angles 18 are fixed to the side rail of the car, preferably by bolts. Live rubber blocks 19, two in number, are vulcanized to the flanges of the channel 17 and to the angles 18 to connect the two together. Rubber being resilient, channel 17 can move a limited distance with respect to the angles 18 and consequently the side rails 2 are resiliently mounted upon the wheel-supporting axles 13. Spring-mounting means may be employed within the teachings of the invention, if desired. Mounting plate 14 is duplicated upon the back side of the wheel 3, as seen in Figure 9, this latter plate having arms similar to 15 which are fixed to the spacing blocks 16. By this arrangement, the wheel is boxed in between the arms 15 and the spacing blocks 16, the side rail 2 of the frame being cut away to provide channel 20 into which the wheel extends.

In order to guard against the possibility of a passenger standing upon the floor of the car, and thereby increasing the likelihood of his being thrown from the car by the movement of the train, there is provided a safety top which will be best seen in Figures 1, 2, 3 and 4. Preferably the top consists of parallel sills 21 and 22 which are adapted to over-lie the side frame member 1 of the car and similar side sill members 23 and 24 which are adapted to over-lie the side frame member 2 of the car. The sill members are connected together by spacing bars 25 which are rigidly fixed thereto in any preferred manner such as by welding. Mounted upon and extending between the outer sill members 21 and 24 are a plurality of generally U-shaped arches 26, 27, 28, 29, 30, 31 and 32 which are parallel to each other and disposed at right angles to the plane containing the sills.

Figure 2:
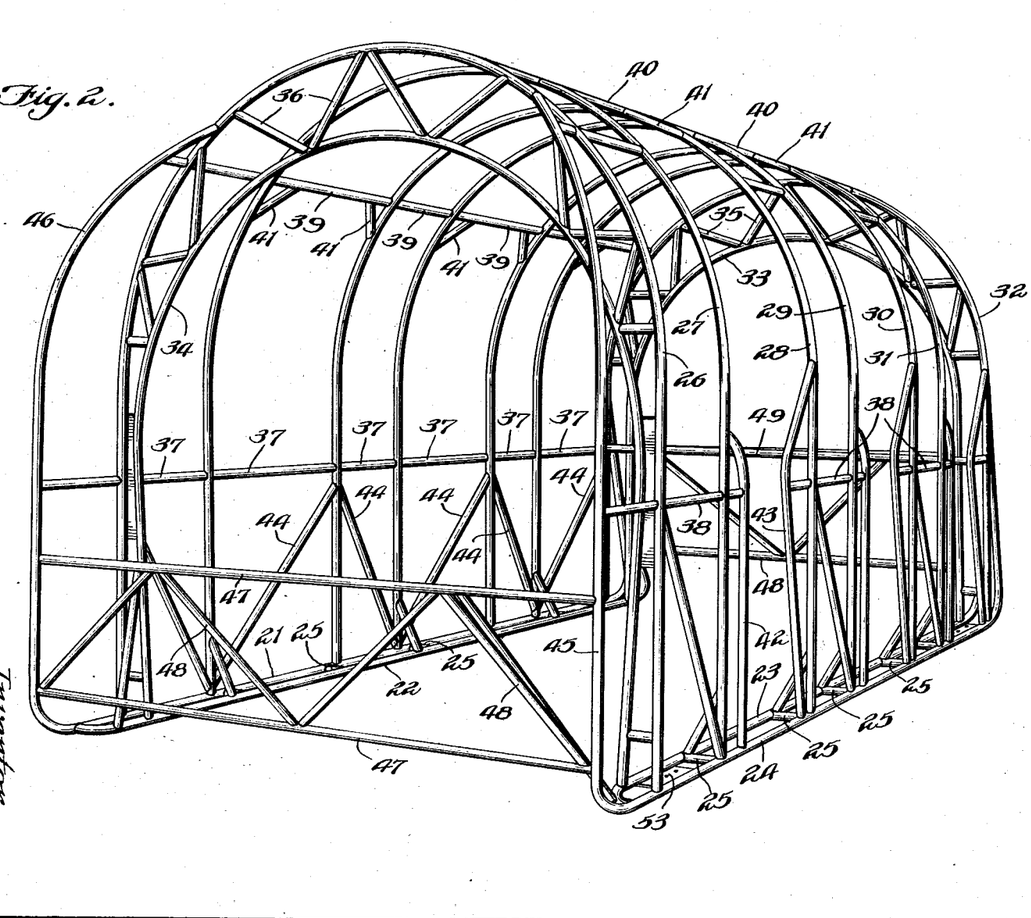
Fig. 2 is a three-quarters perspective view from the rear end of a top frame structure adapted to fit over a car that is to be loaded and unloaded from the right-hand side.
Figure 3:
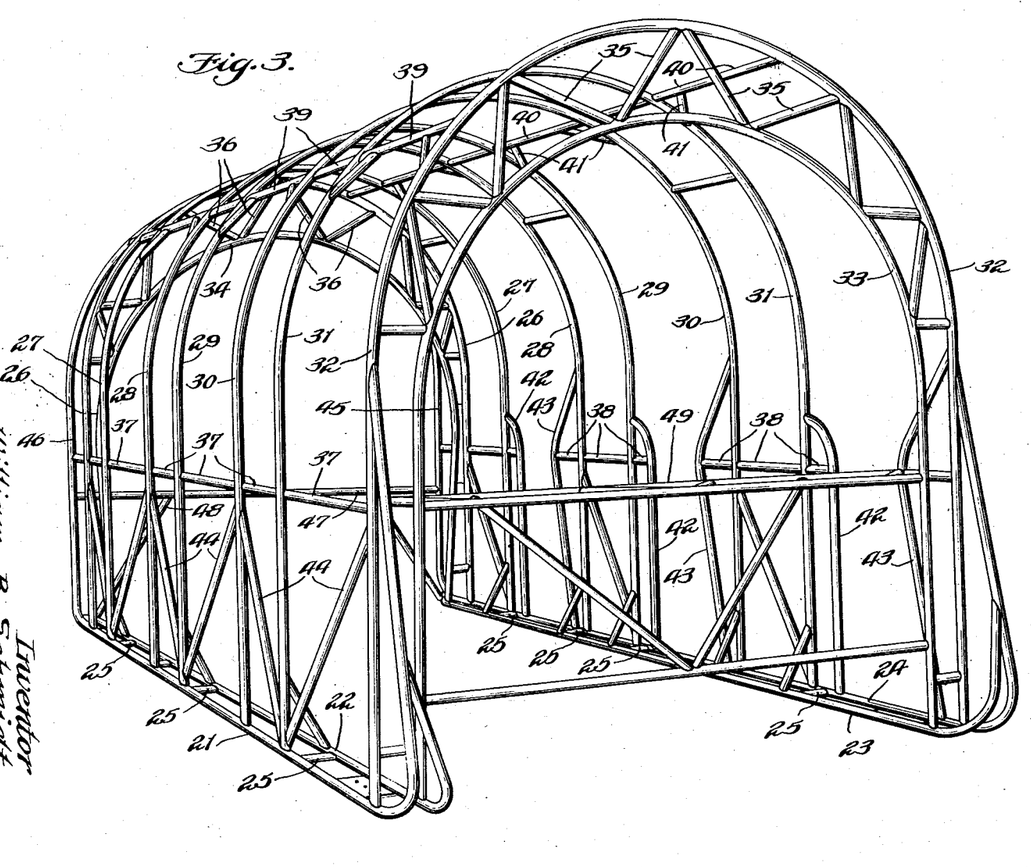
Fig. 3 is a three-quarters perspective view from the front end of a top frame structure adapted to fit over a car that is to be loaded and unloaded from the left-hand side.

The front end arch 32 and the rear end arch 26 are each provided with similar arched members 33 and 34, respectively, which are fixed to the inner ones 22 and 23 of the sills, there being reinforcing members 35 extending between the arches 32 and 33 and similar reinforcing members 36 extending between the arches 26 and 34. As shown, these reinforcing members 35 and 36 are set at angles of 45° to the radius of the arch at the point of their attachment, but obviously this may be varied within the teachings of the invention. By this construction the front arch 32 and the rear arch 26 of the framework are made to be very stiff and strong. A plurality of horizontal bars 37 are extended adjacent ones of the arches on the back side of the framework to form a bottom line for windows, as will hereinafter appear. Similar horizontal members 38 extend between certain ones of the arches on the front side of the car at the same height above the sill. Other horizontal members 39 extend between the arches on the rear side of the framework to form tops for the windows and similar horizontal members 40 extend between the arches on the opposite side of the framework to form tops for the doors. Angle braces 41 are fitted into the upper sections of the doors and windows substantially as shown.

It will be noted that the spacing of the arches 26-32, inclusive, is not uniform. Arch 26 which is the rear arch of the framework will be positioned near the rear end of the rear seat of the car, as will be seen in Figure 1. It will be noted that the reinforcing arch is moved outwardly toward the arch 26 near the horizontal frame members 37 and 38 to provide clearance between the arch and the back of the rear seat of the car. The adjacent arch 27 is positioned near the front edge of this rear seat. The next arch 28 is positioned in the same relation with respect to the back of the next to the rear seat and arch 28 is near the front of that seat. As will be seen in Figure 2 a short member 42 is fixed to the outer sill 24 and extended upwardly parallel to the arch 27 to a point above the horizontal members 38 and then bent inwardly toward the arch 27 to which it is attached. A similar member 43 is attached to the sill 24 and extended upwardly at a slight angle with respect to the arch 28 to a point just above the horizontal members 38 and then bent forwardly and brought into engagement with the arch 28. Members 42 and 43 together define a doorway leading into the rear seat of the car, similar members being affixed to the corresponding arches to form doorways for the other seats of the car.

On the rear side of the car a plurality of diagonal braces 44 extend upwardly from the junction points of the arches and sills to pass just beneath the bottom members 37 of the window openings, these members 44 serving to reinforce the frame.

Figure 5:
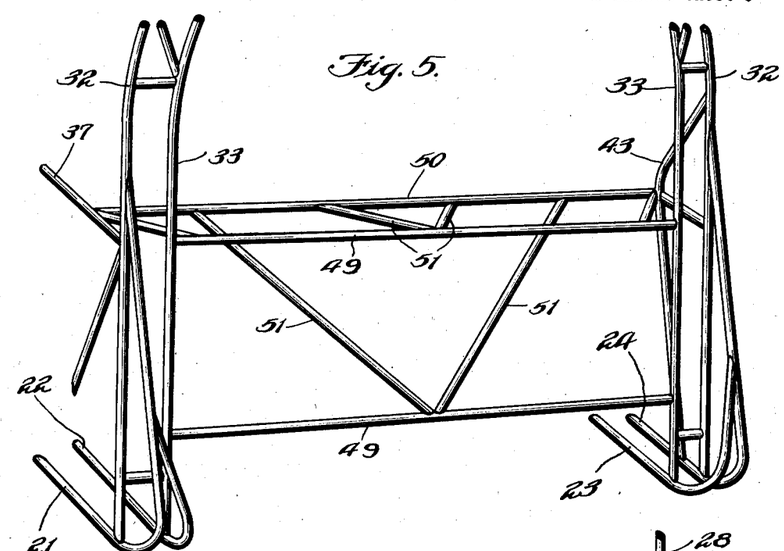
Fig. 5 is a fragmentary elevational view of the front end of a framework showing the handle bar arrangement thereof.

As will be seen in Figure 2, the outer sill 24 is extended rearwardly of the back arch 26 and then upwardly at 45 to a point near the top of the door, and outer sill member 21 is similarly extended upwardly as shown at 46. These two extensions are connected together by horizontal members 47 which in turn are connected together by cross braces 48 to stiffen the end of the frame for a purpose which will hereinafter appear. As will be seen best in Figure 3, the outer members of the sills are extended upwardly a lesser distance ahead of the front arch of the top and the inner members of the sill are likewise extended upwardly and join to the extensions of the outer sill members. Cross members 49 extend between the bottom portions of the inner arch 33, as will be seen best in Figure 5 and a bar 50 extends between the window frame member 37 on the one side and the door frame member 43 on the other side of the framework. Suitable cross braces 51 extend between the members 49 and 50 to stiffen the front end of the framework. Bar 50 serves also as a hand rail for the front seat of the car.

It will be apparent to one skilled in the art that the foregoing framework members form trusses which add strength to the structure. End arches 26 and 32 are trussed arches. The spacing members 25 between sills 21 and 22, and 23 and 24, form trussed sills which resist side stress on the top. Braces 44 and door frame members 42 and 43 assist the intermediate arches and longitudinal members 37, 39 and 40 in forming trusses which resist vertical stresses on the structure. As a result of this construction, the framework has been found to be capable of withstanding the stresses placed upon it in service upon a car of a roller coaster train.

The foregoing description covers the framework of an intermediate car of the train, and while a particular framework is shown and described in detail, it will be apparent to one skilled in the art that changes may be made to meet particular requirements within the teachings of the invention. The framework to serve its intended purpose must be very strong and at the same time as light as possible. I have found that a chrome molybdenum steel tubing, commonly known as "aircraft tubing," is very satisfactory for this purpose, although the use of other materials is contemplated. All joints in the framework just described are welded so that the frame is a self-contained, self-braced structure which is very rigid in parts and sufficiently flexible in other parts to permit it to be altered in shape by the movements of the parts of the car upon which it is mounted.

The framework thus formed is mounted upon the side rails of the chassis of the car in the manner best seen in Figure 4. Resilient mounting means 52 are fixed to the frames 1 and 2 of the chassis and to the mounting plates 53 which are fixed to the sills of the top framework. As shown in the drawings, the resilient mounting means 52 are of the same type as shown in Figure 9, but it will be understood that other resilient mounting devices may be used within the teachings of the invention. Four mounting means 52 are shown, there being one at each corner of the frame, but in certain instances the use of intermediate mountings is contemplated.

The vertical side portions of the arches of the top framework are disposed alongside of the end plates 6 and 7 of the seats, at a distance outwardly therefrom, as will be seen best in Figure 4. By this arrangement the top may move with respect to the seats, or the seats may move with respect to the top without interference one from the other. The frameworks shown in Figures 2 and 3 are arranged to fit over the intermediate cars of a train. As will be seen in Figure 8, when the two cars are coupled together by the coupler 54, the frameworks of the car are spaced some distance apart. The portion 45 extending rearwardly of the rear main arch 26 of the framework on the forward car extends back of the frame of the car, and the portions of the sills of the top framework extending forwardly of the front main arch 32 extends ahead of the frame of the trailing car. Thus, the space between the two cars is partially closed by the tops. It will be noted that the top frameworks do not abut each other but rather a space is left therebetween to permit the cars to move apart and together as the train is traveling over the track. The arcuate shape of the rearwardly-extending portion 45 of the leading car permits the top end of the arch 26 thereon to move rearwardly with respect to the trailing front arch 32 as the front car starts up an incline while the rear car is on level track, without bringing the two frameworks into engagement with each other.

Figures 7, 17, 18:
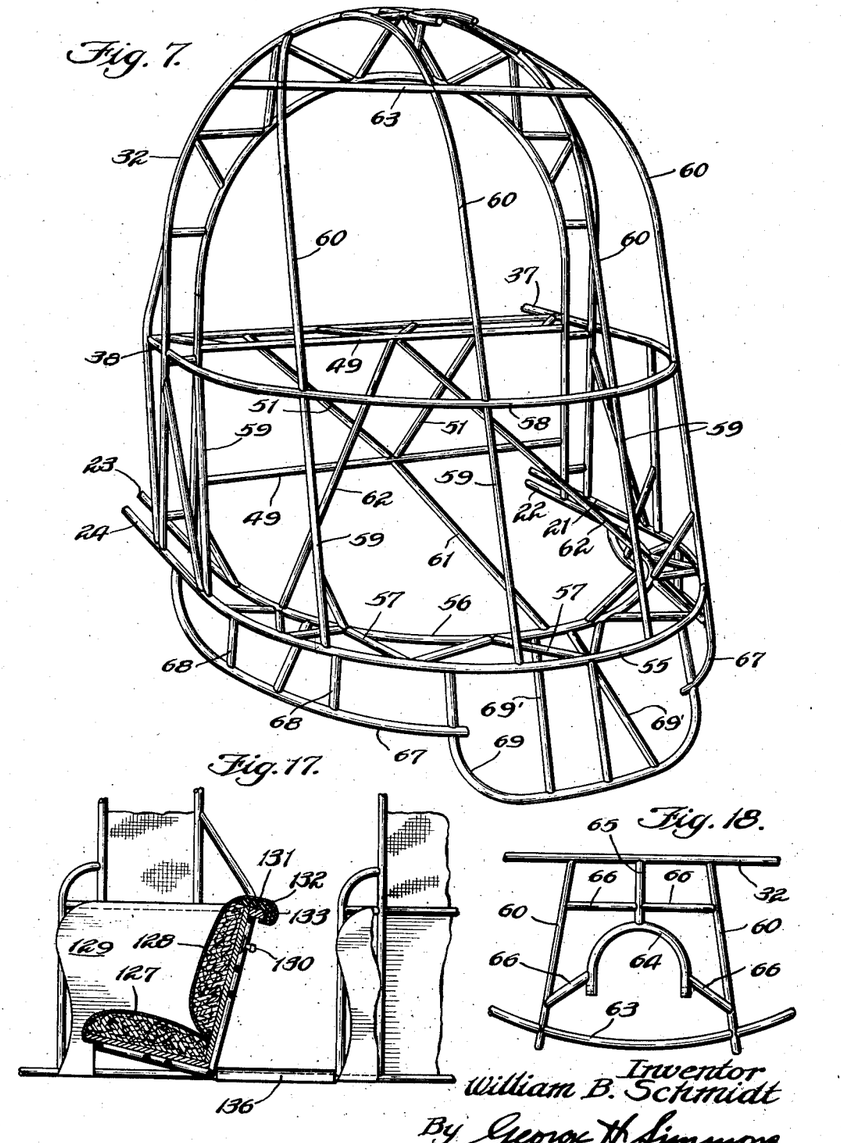
Fig. 7 is a fragmentary three-quarters perspective view of the front end of a top framework with a nose framework attached thereto.
Fig. 17 is a fragmentary elevational view taken along the median line of a car and showing in section a seat supported upon the supports shown in Figure 6 and also showing a nose guard affixed to the seat.
Fig. 18 is a fragmentary plan view of the framework shown in Figure 7, showing particularly the headlight-mounting bracket.

As will be seen in Figure 7, the front end of the top framework is equipped with a nose structure consisting of an outer arch 55 disposed in the plane of the sills of the top and formed as an extension of the outer sill members 21 and 24. A second and similar arch 56 is disposed inside of the arch 55 being formed as an extension of the inner sill members 22 and 23. Suitable cross-bracing members 57 extend between these arches to stiffen them. A second arch 58 is extended outwardly from the end and arch 32 in line with the side horizontal members 37 and 38 of the top, the arch 58 being slightly shorter than the arch 55 so that generally vertically-disposed members 59 which tie these two arches together will slope slightly with respect to a vertical and will be farther from the arch 32 at the points of their junction with the arch 55 than at the points of their junction with the arch 58. Generally vertical members 60 which are essentially continuations of the members 59 extend from the arch 58 in an arcuate path into engagement with the front main arch 32 of the top. A horizontal brace 61 is extended from the cross bar 49 to the midpoint of the inner front arch 56 and diagonal braces 62 extend from the upper cross piece 49 downwardly and outwardly to the arch 56 to stiffen the nose structure. A second and smaller arch 63 is disposed parallel to the arch 58 and extends from the arch 32 into engagement with generally vertical members 60 to stiffen the upper part of the frame.

The framework thus formed may be used either for a nose structure projecting ahead of the front arch 32 of the front car or a tail structure extending rearwardly from the rear arch 26 of the rear car. In the case of the nose structure, an additional apron consisting of arcuate members 67 is disposed beneath the main sill arch 55 and connected and reinforced with respect thereto by suitable brace members 68. A "cow catcher" 69 extends downwardly from the sill arch 55 and is braced with respect thereto by braces 69' as well as by the apron members 67.

When used as a nose structure, the framework is preferably provided with a headlight mounting which may be of the type shown in detail in Figure 18. As shown, the mounting consists of a U-shaped bracket 64 adapted to receive the mounting pintles on the headlight. The bracket is mounted on the median line of the framework near the top thereof by a suitable bar 65 fixed to the front arch 32 and to the bracket and by bars 66 fixed to the adjacent frame members 60 and to the bracket and bar 65.

When the framework is used on the rear car, the projecting part is substantially the same as above and may have substantially the same shape. The "cow-catcher" structure extending below the plane of the sills of the framework and the headlight mounting are omitted and tail lights may be substituted, if desired.

The nose and tail structures just described serve also to safeguard passengers on the train in the event of a collision between two trains. The nose structure extends several feet ahead of the chassis of the front car and the tail structure extends several feet back of the chassis of the rear car. Both structures are made very strong, much stronger than would be necessary if their only function was to add the appearance of streamlining to the trains. Should two trains run together the nose and tail structures must be crushed before the chassis of the one car can hit the chassis of the other car. The tops are mounted upon their respective cars by resilient means so that the impact of a collision will be doubly cushioned and injuries to passengers will be lessened.

The top frameworks thus formed are covered with a skin or covering composed of sheet-like material, either metal, wood or a composition, to close in the top. Preferably, a solid sheet of material 70 covers the bottom portion of the framework; i. e., the space from the sill member 21, Figure 2, upwardly to the horizontal members 37 at the bottom of the window openings, and also from the sill member 24 upwardly to the horizontal members 38 on the front or loading side of the car. Obviously, this sheet metal will not cover the doorway openings formed by frame members 42 and 43. The remaining portion of the top; i. e., upwardly from the horizontal members 37 over the top of the arches and down to the horizontal members 38 is preferably covered with an openwork material 71 which may be screen wire, expanded metal or perforated sheet metal. The covering members extend around the nose and tail structures projecting from the front and rear car, respectively, and are securely fastened to the frameworks in any preferred manner. If the coverings are composed of metal they may be spot-welded to the framework or secured thereto by bolts, within the teachings of the invention.

The coverings may be painted or left in natural colors, as desired. In one train built in accordance with the teachings of this invention, the solid sheet material 70 on the bottom part of the framework is composed of bright, shiny metal that is corrugated in the manner best seen in Figure 16. The shiny metal catches and reflects light played upon it by lighting means 72 alongside of the track to give a particularly desired lighting effect. The openwork material 71 on the top of the frames of this train is composed of the same bright, shiny metal perforated to give visibility and adapted to reflect light played upon it.

Figure 8:
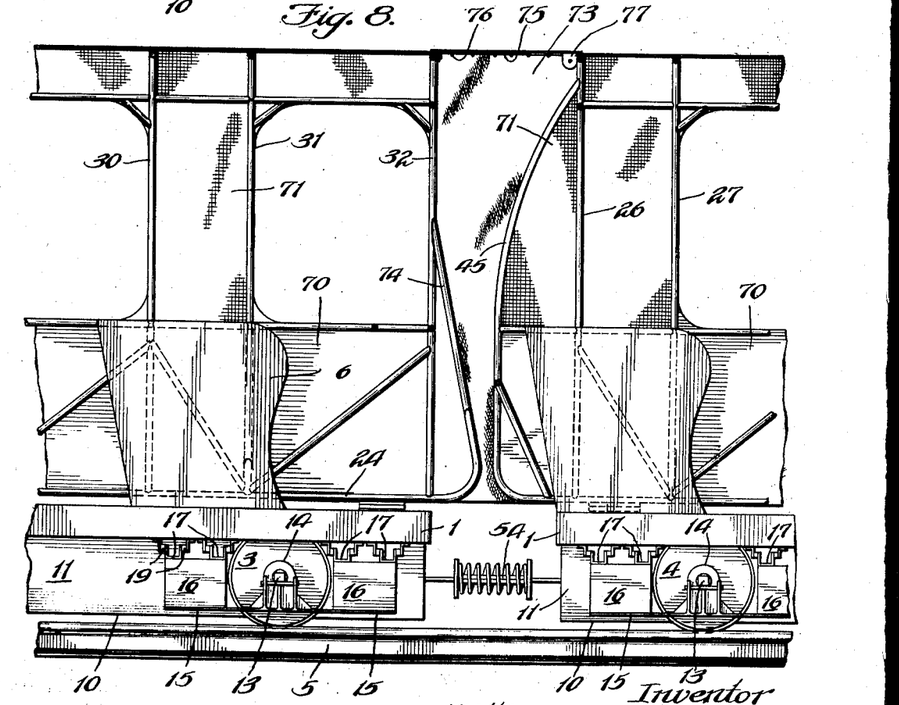
Fig. 8 is a fragmentary elevational view of two cars with the tops broken away on the median line thereof and showing the coupling and top extending therebetween.

In order to carry the lines of the covering members 70 and 71 from one car to the next, I have provided a flexible member 73, Figure 8, which is attached to the rearmost frame members 45 of the leading car and the foremost frame members 74 of the trailing car. A plurality of spring-wound tapes 75 are connected between the frame members 26 and 32 near the top thereof and run through rings 76 on the flexible member 73 to hold this member substantially in line with the skin 71 on the top frameworks. A springwound means 77 attached to the frame member 26 keeps the tape member 75 taut so that the line of the top will be substantially maintained between the two cars at all times. I have found that the members 73 may well be fabric, painted or otherwise colored the same as the coverings 70 and 71 on the cars so that through its use the space between the cars is completely filled and the streamline effect of the train maintained therebetween.

Figure 10:
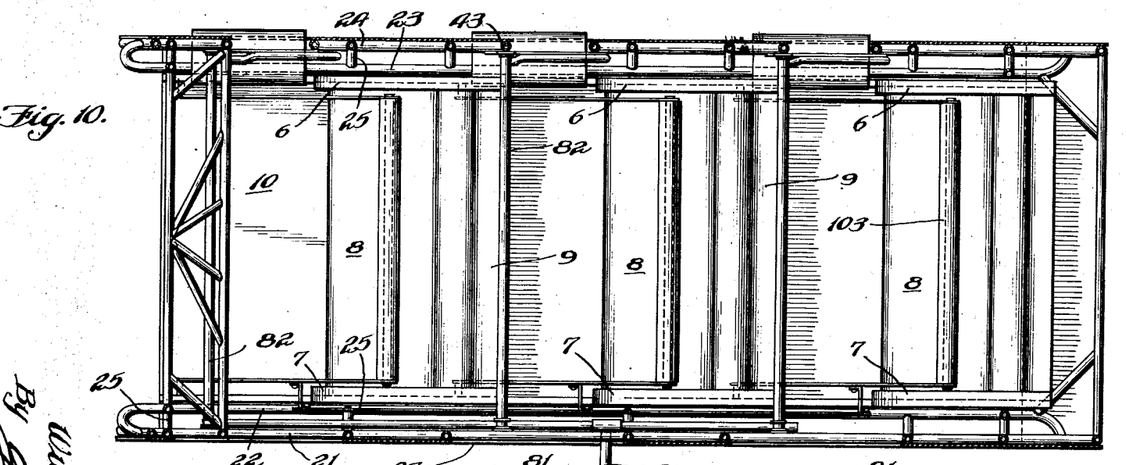
Fig. 10 is a plan view of a car, with the top cut away along a horizontal plane through the bottoms of the windows and showing particularly the arrangement of swinging doors and handle bars therein.
Figure 11:
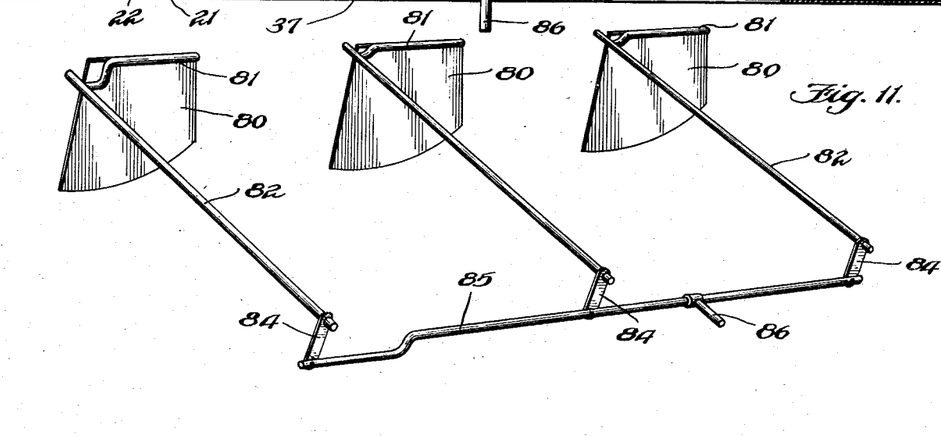
Fig. 11 is a skeleton view in perspective of a swinging door operating mechanism.

The doorways in the car through which passengers enter and leave the seats are preferably blocked while the train is in motion to prevent the passengers from attempting to leave the train until it has come to rest. Doors are provided for this purpose and may be mounted in a number of ways within the teachings of the invention. In Figures 10 and 11 I have shown doors which are pivoted for swinging about horizontal axes into and out of the doorway, and in Figures 12, 13, 14 and 15 I have shown doors adapted to slide across the doorways. The sliding doors completely block the openings when closed and the lines of the solid covering 70 are not broken. This is particularly advantageous when a corrugated bright metal covering 70 is used, since the door can be composed of the same material.

As will be seen in Figure 10, swinging doors consist of flag-like doors 80, each of which depends from a bar 81 that is fixed to and projected at substantially right angles from an operating bar 82. The operating bars 82 are mounted in suitable bearings 83, Figure 4, fixed upon the door frame member 43 on one side of the top and upon the horizontal member 37 on the opposite side of the top, these bearings being located so that the bars 82 extend along the back side of the back rests 9 of the seats.

Bars 82 are each equipped with an operating lever 84 fixed thereto at a point near the back or window side of the top, these levers being connected together by an operating bar 85 to which they are pivotally connected. The operating bar 85 runs along the back side of the car in the space between the end 7 of the seat and the top framework, as will be seen in Figure 4. An operating handle 86 is fixed to the operating bar 85 so as to be capable of rotation around the axis of the bar, but incapable of movement longitudinally therealong. The handle 86 projects through a slot 87, Figure 1, in the skin 70 which slot is generally C-shaped. When the doors are in closed position, that is with the bars 81 in horizontal position as shown in Figure 11, operating handle 86 is nested in a socket at one end of the slot 87 to lock the doors in place. When it is desired to open the doors, the operating handle is rotated upwardly out of this socket and into the main slot 87 and then moved to the left, Figures 1 and 11, thereby to move the rod 85 and rotate bars 82 in a clockwise direction. This moves bars 81 from a horizontal to a vertical position, permitting the doors to be rotated back into the space alongside of the ends of the seats. At the end of this movement, operating handle 86 is moved downwardly into a socket in the forward end of the slot 87 to lock the doors in open position. It will be noted that the forward one of the bars 82 is mounted lower than the others so as to be below and ahead of the handle bar 50. Door bar 81 is bent upwardly so that the top edge of the door will be in line with the other doors. Operating bar 85 is bent downwardly to connect with the lever 84, which is just like the other levers.

Figures 12, 13, 14, 15, 16:
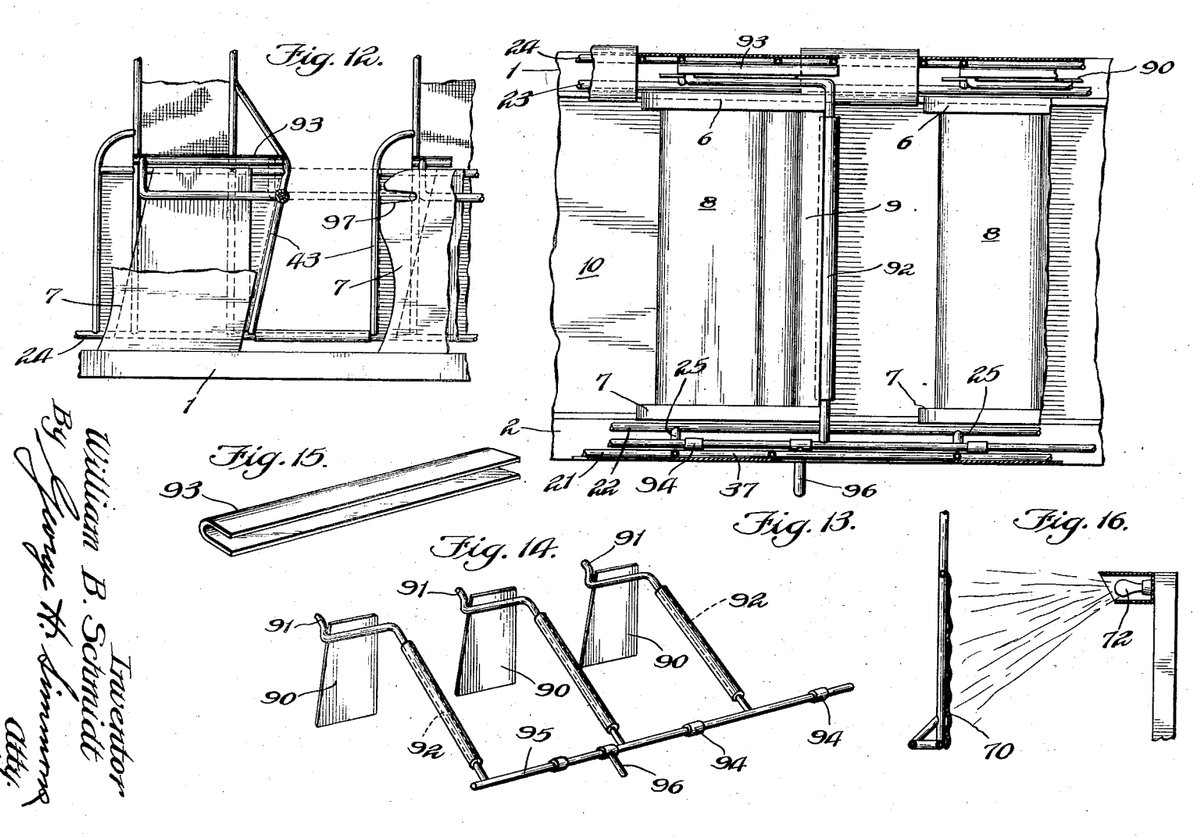
Fig. 12 is a fragmentary elevational view showing particularly a sliding door arrangement.
Fig. 13 is a fragmentary plan view, similar to Figure 10, and showing sliding door operating mechanism.
Fig. 14 is a skeleton view in perspective of the mechanism for operating the sliding doors.
Fig. 15 is a perspective view of the guideway for the door operating bars shown in Figure 14.
Fig. 16 is a fragmentary elevational view in section showing particularly an arrangement for lighting the sides of the cars.

The sliding door arrangement shown in Figures 12 to 15, inclusive, is of substantially the same construction. The doors proper 90, Figure 14, are supported upon bars 92 which have end portions 91 extending outwardly beyond the plane of the door. These portions 91 project into a U-shaped guide 93 that is mounted upon the framework of the top in the space between the ends of the seat and the top. Bars 92 are connected together by an operating rod 95 which is mounted for movement longitudinally of the top by suitable journals 94 that are mounted upon the horizontal members 37 on the rear or window side of the car. An operating handle 96 is identical in construction and purpose to the operating handle 86, previously explained.

When the doors are open, bars 92 are moved forwardly of the car into position against the back of the back rest 9 of the seat ahead of the doorway in which the bar is located, the end portion 91 of the rod being moved to the forward end of the U-shaped guide 93. The door is then positioned in the space between the top and the end of the seat. When it is desired to close the door, the operating handle 96 is moved rearwardly and the end of the rod 92 caused to slide in the guideway 93 to bring the bar 92 back into U-shaped slots 97 cut in the forward edge of the ends 6 and 7 of the seat. The doors come to rest across the doorway openings left between the frame members 42 and 43 and the bars 92 extend across the seats just above the laps of the passengers therein. Preferably, the bars 92 are covered with a soft material such as rubber and serve as handle bars which may be grasped by the passengers.

In certain instances it may be advantageous to equip the cars of the train with handle bars 40 of the type shown in Figures 1 and 4. These bars consist of levers 100 and 101 pivoted to the side members 11 and 12 by suitable pivots 102 located near the floor 10 of the car, Figure 4, and connected together at their upper free ends by a handle bar 103 which is preferably heavily coated with a soft resilient material such as rubber. The bars 100 and 101 fit just inside of the end members 6 and 7 of the seats.

Levers 101 are connected together by a bar 104 which is pivotally connected to each lever and is disposed in the space between the end member 7 of the seat and the top. One of the bars 101 carries a locking lever 105 which extends through a slot 106 in the wall member 12 of the car and is connected to a locking cam 107 that is disposed upon the outside of the wall 12. The locking cam 107 is pivoted for rotation about an axis 108. The spring 109 is connected between the side frame member 2 and the locking cam 107. The cam carries extension 110 which projects downwardly alongside of the rail 5. The handle bars 103 are pushed forwardly away from the seat into position alongside the back of the preceding seat to permit passengers to enter and leave the seat. Operating cam 107 is then in the dotted line position, Figure 1, and the axis of pull of spring 109 is above a line drawn from the point of attachment of the spring to the frame 2 and the pivotal axis 108 of the cam 107.

After the passengers have been seated in the car, the handle bar is pulled back into the position into which it is shown in Figure 1 and the locking cam 107 and lever 105 are moved into the position in which they are shown in full lines in Figure 1. The line of tension of the spring 109 is then below the pivotal axis 108 and that spring thereby is enabled to lock the handle bars in position. A wedge block 111 located alongside of the track 5 is adapted to be engaged by the extension 110 as the car moves into the unloading platform. Extension 110 rides over the wedge and is raised thereby to rotate locking cam 107 in a counterclockwise direction about its pivotal axis 108 to unlock the handle bars and to permit them to be moved against the back of the preceding seat. Wedge 111 extends past the unloading platform and part of the loading platform. After the train is loaded and is leaving the loading platform, an attendant re-locks the handle bars in position over the laps of the passengers.

Figure 6:
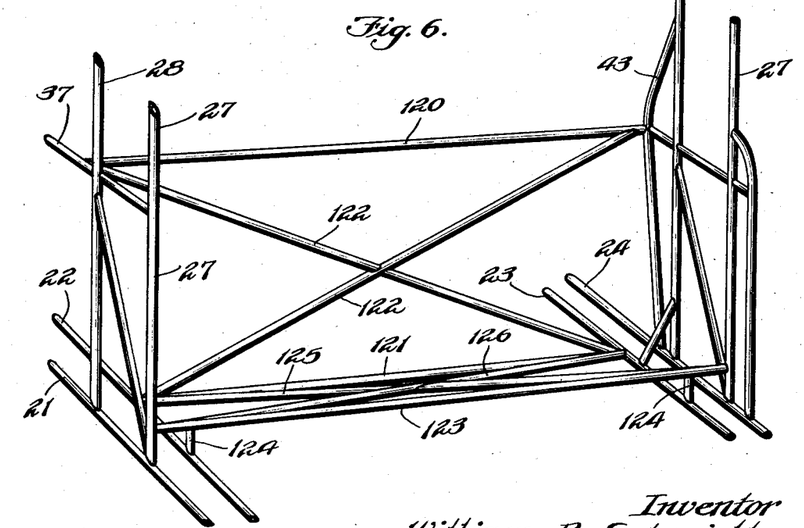
Fig. 6 is a fragmentary perspective view of a top framework showing seat supports fixed thereto.

Throughout the foregoing description, the safety top of the present invention has been added to an existing car in which the seats are mounted in the framework of the chassis transversely thereof. In some instances it may be advantageous to mount the seats in the top structure rather than to form them as a part of the car. This can be accomplished within the teachings of the invention in the manner shown best in Figures 6 and 17. A horizontal bar 120 is extended from the door frame member 43 across the top into engagement with the horizontal member 37 on the back side of the top. A second horizontal member 121 is extended between the inner sill members 22 and 23 substantially in alignment with the point of attachment of the lower end of the door frame member 43 with the outer sill 24. Suitable cross-braces 122 extend between the bars 120 and 121. A third horizontal bar 123 extends between the lower ends of an arch such as 27 at a point a few inches above the point of attachment of the arch 27 to the outer sill members 21 and 24. Vertical braces 124 connect the bar 123 to the inner sill members 22 and 23, and diagonal braces 125 and 126 are extended between the members 121 and 123. By this arrangement the bars 120, 121 and 123 and cross-braces 122, 125 and 126 together form a seat framework.

At will be seen in Figure 17 a cushion 127 and a back rest 128 may be supported upon the framework between seat ends 129 which are similiar in structure and function to the seat ends 6 and 7, shown in Figure 4. As shown, the cushion and back-rest each consist of a board or a flat piece of suitable material resting upon the frame members and secured thereto in any preferred manner, such as by U clamps and bolts, and upon which a sheet of upholstering material is fixed over a quantity of padding material.

By mounting the seats in the foregoing manner, it will be apparent that they will be resiliently mounted with respect to the chassis of the car, since the sills of the top are mounted upon the chassis by resilient means such as 52, Figure 4. The horizontal bars 121 and 123 are capable of a certain amount of give as are the sills 21—24, inclusive, so that a new and different riding effect is achieved when the seats are mounted in the top structure.

Figure 17 also shows a hand rail 130 fixed to the back of the back-rest 128 so that it may be grasped by a passenger in the following seat. It occasionally happens that a passenger will be thrown forward from the seat and will strike his face or head against the back of the preceding seat, with the result that he sustains an injury for which the amusement park is liable in damages. In Figure 17 I have shown a device for safeguarding passengers from injury of this kind which consists of a block of material 131 extending rearwardly from the back of the bask-rest 128. This material may conveniently be wood. A quantity of soft spongy material 132 is placed over the block 131 so as to extend upwardly and rearwardly therefrom, and the covering material 133 of the backrest is extended over this resilient material 132 and secured to the block 131. Should a passenger be thrown into contact with the back of the seat his head will strike against a highly padded object and no injury will be sustained. The fact that the padding 132 extends rearwardly some distance from the back of the seat renders it unlikely that a passenger will be thrown into engagement with the hand rail 130, since that rail is fitted directly under the pad.

As will be seen in Figure 4, the resilient means 52 by which the sills of the framework of the top are mounted upon the side frame members 1 and 2 of the car serve to space those sills at a considerable distance from the top surface of the side frame members. Passengers entering or leaving the car might catch their toes in the sill members and be tripped thereby. To guard against this contingency, I have provided a toe plate consisting of a generally C-shaped metallic plate 135 which is covered by a suitable covering 136 which may conveniently be rubber material, such as is commonly used upon the running boards of an automobile. The plate 135 is secured to the sill members 23 and 24 by a bolt 137 that is fixed upon the plate 135 and extends through a clamping plate 138 disposed below the sills. Tightening the nut threaded upon the bolt 137 securely clamps the toe plate upon the sills. As will be seen in Figures 10, 12, 13 and 17, the toe plates extend completely across the doorways leading into the car.

From the foregoing, it will be apparent that the safety devices of my invention are possessed of many advantages. When added to an existing train of cars, the safety tops serve both to make the train more pleasing in appearance and to make it safer. Safety is achieved by definitely preventing passengers from standing up while the train is in motion, and from entering or leaving a car while the train is in motion. The nose and tail structures, seemingly added merely for the purpose of adding the effect of streamlining to the car, serve also as safetay bumpers since if two trains are run together, the projecting nose and tail structures must be crushed before the cars, proper, can come into contact with each other. Stresses and strains resulting from such an impact are transmitted to the tops which are resiliently mounted upon the cars and the shock transmitted to the cars, themselves, and hence to the passengers, will be greatly reduced. The tops are capable of being constructed of many materials which can be painted in attractive colors or left in the natural color of the material; and, in case a shiny material is used, unusual lighting effects can be achieved to add attractiveness to the train.

Safety devices within the cars assist in holding the passengers in their seats, thereby reducing the possibility of passengers being injured by being thrown from the seats. The backs of the seats are protected with a padding which may be termed as a nose-guard to prevent a passenger from being injured about the head and face by coming into engagement with the back of the seat.

The teachings of the present invention also provide new riding sensations by mounting the seats as a part of the safety top framework rather than as a part of the chassis of the train.

Maintenance and repair costs are reduced by departing from the usual custom of rigidly mounting the wheel-supporting axles with respect to the chassis of the car and substituting therefor a resilient mounting for these axles.

While I have chosen to show my invention by illustrating and describing a preferred embodiment of it, I have done so by way of example and am not to be limited thereby as there are many modifications and adaptations which can be made by one skilled in the art within the teachings of the invention.

Having thus shown and described my invention, what I consider new and desire to have protected by Letters Patent is pointed out in the appended claims.

What is claimed is:

1. An amusement car comprising, a frame, wheels for supporting said frame upon a track, resilient means for supporting the frame upon said wheels, a top comprising a framework and a covering fixed thereto, resilient means for supporting said framework upon said frame, a plurality of seats, and means fixed to said framework for supporting said seats within said top transversely of said frame.

2. An amusement car comprising, a frame, wheels for supporting said frame upon a track, resilient means for supporting the frame upon said wheels, a floor supported upon said frame, a top consisting of a framework and a covering fixed thereto, resilient means for supporting said framework upon said frame, a plurality of seats, means fixed to said framework for supporting said seats within said top transversely of said frame, said means permitting said seats to give vertically of said top a limited distance, and a handle bar pivoted to said frame in front of each seat and adapted to be locked in position over the seat in fixed position relative to said floor.

3. The combination with an amusement park car having a plurality of seats, of a safety device therefor comprising, a frame, a covering secured to said frame, there being door and window openings in said frame and covering in juxtaposition to said seats, resilient means for mounting said device upon said car, a door fitted in each of said doorways and adapted to slide with respect to said frame, operating bars for said doors adapted to slide longitudinally of the device to operate said doors, sockets into which said bars register when the doors are closed, means for locking said doors closed, said operating bars then being positioned over the seats to form handle bars.

4. The combination with an amusement park car having a plurality of seats, of a safety device therefor comprising, a frame, a covering for said frame secured thereto, there being a door and a window opening in said frame and covering in juxtaposition to each of said seats, resilient means for mounting said device upon said car, and door means mounted upon said device and adapted to be moved across said door openings to close the same.

5. A safety device adapted to be fitted upon an existing amusement ride car and to rest upon a ledge-like portion of the car disposed above the floor thereof, comprising, a plurality of arches disposed in spaced apart relation, means including an inner arch and brace members connected thereto for reinforcing the end ones of said arches to stiffen the same, a plurality of members extending between adjacent ones of said arches and fixed thereto, sill means extending from end to end of the device along the open end of said arches and fixed to the ends thereof, and a cover means extending over the frame thus formed and fixed to said arches, members and sill means.

6. A safety device for the cars of an amusement park train adapted to fit upon the side walls thereof that extend from the floor to the approximate level of the seats of the car, comprising, a framework for each car fixed upon the side walls of the car and extending upwardly therefrom outside of the seats and thence over the seats at a height low enough to prevent standing up in the car, extensions of said frameworks on the end cars of the train projecting beyond the car in the direction opposite from the adjacent car and being shaped to give the appearance of streamlining to the train a structure depending from each extending framework to approximately the level of the floor of the car, means covering said frameworks and extensions, there being door openings in said means on one side of the frameworks and window openings therein on the other side thereof, flexible means simulating said covering means and extending between adjacent ones of said frameworks, and door means mounted upon said frameworks and extending across said door openings.

7. In a safety device that is adapted to be added to an amusement car, a frame comprising, a pair of parallel sills each consisting of parallel members connected together by reinforcing means, a plurality of U-shaped members fixed to the outer members of said sills and disposed parallel to each other, a smaller U-shaped member fixed to the inner members of said sills in the planes of the end ones of said first U-members, reinforcing means extending between each of said end U-members and the smaller U-member alined therewith, braces extending between one of said sills and said U-members, said braces and members together forming doorways on one side of the car, longitudinal bars extending between the end ones of said U-members and fixed thereto and to the intermediate ones of said U-members, said bars and U-members together forming windows on the other side of said device, and a covering means extending over said frame and between said doors and windows and fixed to said sills, U-members, braces and bars.

8. The combination with an amusement park car having a frame and transversely-disposed seats supported thereon, there being a ledge-like portion extending along the sides of the car and outside of the ends of said seats and above the floor of the car, of a safety device for said car comprising sills disposed above said ledge-like portions, arched members fixed to said sills and extending therebetween and over said seats, covering means fixed to said sills and members to close in safety device, there being door and window openings in said covering extending between said seats, and toe plates fixed upon said sills in said door openings to prevent a passenger from tripping thereon.

9. The combination with an amusement train, composed of a plurality of connected cars, each containing seat means supported within a chassis that extends to the approximate level of the seat means and is equipped with track engaging wheels, of means for attracting and safeguarding passengers, comprising, an ornamental safety device supported upon the chassis of the car and extending over the seat means therein at a height low enough to prevent standing up in the car, there being door openings and window openings in said devices both in juxtaposition to said seat means, a nose structure on the device on the front car extending forwardly from said car, a tail structure on the device on the rear car extending rearwardly from the car, said nose and tail structures being shaped to add the appearance of streamlining to the train and serving to cushion the impact of two trains in case of a collision, and safety door means mounted upon said devices to prevent passengers from leaving the cars while the train is in motion.

10. A safety device adapted to rest upon that part of the chassis of an amusement car extending outwardly from the ends of the transverse seats of the car at approximately the same height above the floor as the seats, comprising, a sill disposed on each side member of the chassis of the car, resilient means for holding said sills upon the chassis, U-members fixed to said sills and extending over the car, longitudinal members extending between said U-members and fixed thereto, bracing means fixed within the plane of the U-member located behind the rear transverse seat of the car and within the plane of the U-member located ahead of the front transverse seat of the car, braces extending between the intermediate ones of said U-members and said sills, said braces, U-members and longitudinal members together forming door frames on one side of the car and window frames on the other side of the car, and a covering means fixed to said sills, U-members, longitudinal members and braces and extending between said doors and windows.

11. The combination with an amusement train composed of a plurality of connected cars, each containing a plurality of seats supported within a chassis that is equipped with track-engaging wheels, of devices for attracting and safeguarding passengers, comprising, an arched-top framework mounted by resilient means upon the chassis of each car and extending over the seats therein at a height low enough to prevent a passenger from standing up in the car, a nose structure extending forwardly of the framework on the front one of said cars, a tail structure extending rearwardly of the rear end of said cars, a corrugated bright metal covering fixed on said frameworks and structures with the corrugations horizontal and extending from the chassis of the car upwardly to a line just above said seats, a perforated bright metal covering extending upwardly from said line over the top of the framework, there being door openings in said coverings on one side of the car and window openings on the other side thereof, flexible means extending between the top on one car to the top on the next car, said means being arranged to make it appear that said coverings extend between the cars, said coverings and flexible means reflecting light played upon the train to enhance its attractiveness, and door means supported on the top structure of each car adapted to extend across said doorways to prevent passengers from leaving the cars while the train is in motion.

12. Means for modernizing a multicar amusement park train to enhance the appearance thereof and to safeguard the passengers therein comprising, a device fixed upon each car of the train, said device having doorways for permitting ingress and egress of passengers, doors adapted to be moved across said doorways to block the same, a front bumper formed as a part of the device of the front car of the train and extending forwardly therefrom, and a rear bumper formed as a part of the device of the rear car of the train and extending rearwardly therefrom, said front and rear bumpers, device, and doors combining to streamline the train from end to end.

13. A frame for a safety device for an amusement park car comprising, a pair of parallel sills each of which comprises parallel tubular members disposed in a horizontal plane, struts extending between the members of each sill to strengthen the same in a horizontal direction, a plurality of generally U-shaped tubular members extending from the outer member of one sill to the outer member of the other sill, said U members being disposed in parallel vertical planes, a second generally U-shaped tubular member extending from the inner member of one sill to the inner member of the other sill in the plane of each one of the end ones of said first U-shaped members, struts extending between said first and second end U members, horizontal tubular bars extending between adjacent ones of said U-shaped members, diagonal braces extending between said sills and U-shaped members, and means upon said sills for mounting the frame upon a car.

WM. B. SCHMIDT.